July 22, 1952
H. M. JENKINS, JR
2,604,348
AUTOMOBILE GRILLE GUARD
Filed Feb. 20, 1951
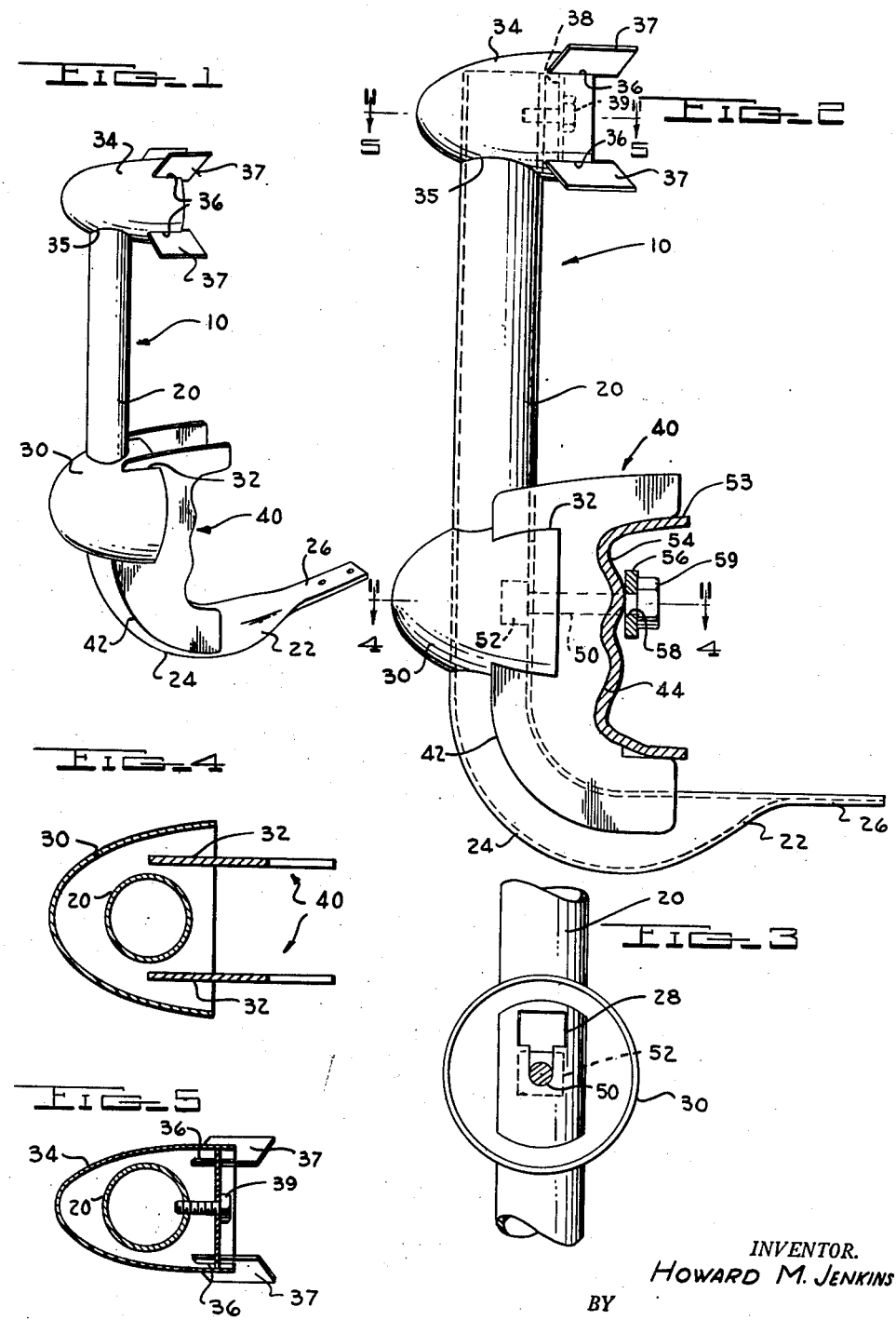
INVENTOR.
HOWARD M. JENKINS Jr
BY
Arthur M. Smith
ATTORNEY Patented July 22, 1952

2,604,348

UNITED STATES PATENT OFFICE 2,604,348

AUTOMOBILE GRILLE GUARD

Howard M. Jenkins, Jr., Detroit, Mich., assignor to Montgomery Steel Products Corp., Birdsboro, Pa., a corporation of Delaware Application February 20, 1951, Serial No. 211,841

3 Claims. (Cl. 293—64)

This invention relates generally to a grille guard and more particularly, but not exclusively, to an automobile grille guard in which the post or upright thereof may be adapted or fitted to different models or makes of vehicles.

At the present time, there are several separate vehicle manufacturers, each of whom produce automobiles and other vehicles having widely varying bumper and grille guard designs which, accordingly, require individual and special grille guards for use with each separate design. Also, it is conventional for each manufacturer to change at least portions of the vehicle design each year or two, which changes normally require essential modification in the grille guard construction and design for use therewith.

With the grille guards in use at the present time, it is necessary to manufacture special grille guards for substantially each different make and new model of vehicle. Each special grille guard normally necessitates individual dies, fixtures and other tools. It is also necessary to manufacture and maintain at all times a relatively large inventory of guards, including at least a complete line of grille guards for use with the current models of the various vehicle producers. This considerably increases the inventory and costs for both the manufacturer and retailer, which inventory frequently results in a substantial loss due to annual changes in models and the like.

Also, there are a large number of people who trade their automobiles each time a new model automobile is produced and, accordingly, these people must buy an entire new grille guard set for such new model, irrespective of the condition of the grille guard on their original automobile.

It is, accordingly, an object of the present invention to provide a grille guard which may be used on any of the models manufactured by the several separate vehicle producers, so as to eliminate the necessity of several separate sets of manufacturing tools to produce a complete line of guards for the various current vehicle models, and so as to reduce the inventory necessary for the sale of this item of merchandise.

Another object of the invention is to provide a grille guard of the above type having an upright adapted to be fitted with any of a plurality of grille guard adaptors, each of which is especially designed for use with a particular model or make of vehicle.

Another object of the present invention is to provide a grille guard in which owners thereof who wish to trade their automobiles for a new model, may obtain new adaptors for the old grille guard posts or uprights for use on the new model.

Another object of this invention is to provide a grille guard comprising a sturdy grille guard post or upright having a pleasing streamlined appearance and yet which is adapted to be easily and readily assembled with any of a plurality of rigid, simple and economical adaptors, which adaptors may have varying contours or designs to facilitate use of the same post with a wide variety of models or makes of vehicles.

Other objects of this invention will appear in the following description and appended claims, reference being had to the accompanying drawings forming a part of this specification wherein like reference characters designate corresponding parts in the several views.

In the drawings:

Fig. 1 is a perspective view of a grille guard comprising an upright and an adaptor shown in assembled relation with the upright.

Fig. 2 is a side elevational view, partly in section, of the grille guard shown in Fig. 1 and illustrated in assembled relation with a vehicle bumper.

Fig. 3 is a fragmentary rear elevational view, partly in section, of the grille guard shown in Figs. 1 and 2.

Fig. 4 is a sectional view taken substantially on the lines 4—4 of Fig. 2.

Fig. 5 is a sectional view taken substantially on the lines 5—5 of Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The grille guard 10 illustrated in the drawings and embodying the features of the present invention comprises generally an upright 20 which is normally positioned vertically in its operative position on an automobile or other vehicle and just forward of the front bumper or just rearward of the rear bumper, as the case may be. The post 20 is provided with a laterally extending portion 22 and preferably has a relatively full curvature at the juncture 24 of the laterally extending portion. The latter is flattened at 26 to facilitate connection with a connecting bar or similar device, which is in turn secured to the frame of a vehicle (not shown). The connecting bar is not illustrated in the drawings, since it forms no part of the present invention.

The grille guard 10 shown in the drawings also includes an adaptor 40 which preferably includes a pair of adaptor plates and is detachably secured to the grille guard upright or post 20. As shown, the plates have a contour at their left side 42, as viewed in the drawings, which corresponds to the adjacent contour of the upright 20 and the plates have a contour on their right side 44 corresponding to the contour of the particular vehicle bumper upon which the grille guard is adapted to be used. While the adaptor 40 shown herein is provided with a contour for use with a vehicle bumper having a highly irregular curvature 44, other adaptors having different contours may be used with the upright 20 when mounting the grille guard on other makes or models of automobiles, or other vehicles.

More particularly, the upright 20 illustrated herein comprises a cylindrical tube or pipe having an enlarged portion 30 in the form of a hyperbolic paraboloid, intermediate the ends thereof for receiving the adaptor 40. The enlarged portion 30 preferably is formed from sheet metal material and has openings on opposite sides thereof through which the pipe is adapted to extend in a direction transverse to the axis of the enlarged portion 30. In practice, the enlarged portion 30 is pressed or forced over the pipe, but it may be welded thereto or otherwise secured if desired.

The enlarged portion 30 is also provided with a pair of parallel slots 32 adjacent the open end thereof for receiving the adaptor plates 40, which slots lie in planes at opposite sides of the axis of the pipe.

As shown particularly in Figs. 2 and 3 of the drawings, a T-slot 28 is provided in the pipe 20 adjacent the axis of the enlarged portion 30 which is adapted to receive the head 52 of a bolt 50 for use in assembling the grille guard 10 on a vehicle. As is believed apparent, the bolt 50 is adapted to extend through a bumper attachment opening 54 in a bumper 53 and through an opening 58 in a bumper bracket 56. The latter bolt is provided with a nut 59 which holds the grille guard post and adaptor 40 in assembled relation on the bumper 53.

The grille guard post 20 is also provided with an ornamental enlargement 34. The ornamental enlargement has a contour corresponding generally to the contour of the enlarged portion 30. The ornamental enlargement 34 is also preferably constructed of sheet metal and is provided with an opening 35 in the lower portion thereof for receiving the upper end of the pipe 20 and is also provided with circumferentially spaced radial slots 36 for receiving a plurality of decorative fins 37 (four shown). The latter may be formed of metal similar to the remaining portions of the grille guard, but are preferably formed of a plastic material of any suitable color.

The decorative fins 37 are each provided with a slot in their inner edge and the fins are held in assembled relation with the ornamental enlargement by a disc 38 which extends into the slots in the fins and is secured to the pipe 20 by means of a bolt 39. The latter is threaded into the upper section of the pipe 20.

The adaptor plates 40 are the only component part of the entire assembly which will require various forms and sizes to accommodate for the varying designs of commercial vehicle bumpers. These plates are preferably flat and may be stamped or otherwise produced without expensive form dies or the like. Accordingly, a large variety of these adaptors may be produced and maintained in stock without excessive cost or without requiring any undue storage space. Yet, while relatively small and compact, these adaptor plates may be formed from a high grade of steel or other similar material such that they will withstand the relatively heavy impacts to which the device is normally subjective.

As is believed apparent from the foregoing, the grille guard of the present invention is well adapted for use on any of the vehicles manufactured by separate vehicle producers simply by providing special sets of adaptors or adaptor plates having contours corresponding to the particular contour of the vehicle bumper to which the device is adapted to be attached. Due to this construction, only a relatively small and simple part of the entire grille guard assembly requires manufacture in varied forms and, in consequence, the dies, fixtures and other tools required for manufacture of a complete line of grille guards are held to a minimum. In addition, the retail dealers carrying and selling grille guards of this type need only carry in inventory a relatively small quantity of the main portions of the grille guard along with a complete line of the various adaptors for use on the different automobiles and other vehicles and particularly for use on the current models of automobiles.

It should also be apparent that grille guard owners who subsequently wish to trade their automobile for a new model may make use of the same main grille guard unit, it being necessary to only purchase the relatively inexpensive adaptors designed to accommodate the new models. Such grille guards may thus have a considerably longer life and greater value to automobile owners.

It should also be apparent from the foregoing that the main portions of the grille guard which require costly tools and fixtures for their manufacture may be used with substantially all the various makes of vehicles and only the adaptor which is extremely simple in construction and economical to manufacture must be produced in varying forms.

The grille guard upright and adaptor disclosed herein may be readily and easily assembled merely by inserting the adaptors into slots provided in the enlarged portion of the grille guard upright and the upright and adaptor are held in assembled relation by the same bolt which is used to assemble the grille guard with the vehicle bumper.

Having thus described my invention, I claim:

1. A grille guard for mounting on a bumper of a vehicle and adapted for use with a plurality of different and distinct makes and models of vehicles, comprising an upright including a substantially vertical cylindrical pipe portion, and an enlarged portion having a substantially hyperbolic contour, said pipe portion extending through said enlarged portion in a direction transverse to the axis thereof, said enlarged portion having a pair of slots extending in essentially parallel planes disposed on opposite sides of the axis of said pipe, and an adaptor including a pair of separate adaptor plates extending into said slots, and attaching means for securing said upright and adaptor to a bumper of a vehicle, said upright and said adaptor being held is assembled relation by said attaching means in the assembled position of the grille guard.

2. A grille guard in accordance with claim 1 and being further characterized in that a bolt is secured to said pipe within said enlarged portion, said bolt extending outwardly and adapted to extend through an opening in the vehicle bumper in the assembled position of the grille guard.

3. A grille guard in accordance with claim 2 and being further characterized in that a T-slot is provided in said pipe which is adapted to receive and hold a head of the said bolt.

HOWARD M. JENKINS, Jr.

REFERENCES CITED

The following references are of record in the file of this patent:

UNITED STATES PATENTS

| Number | Name | Date |
|---|---|---|
| D. 159,392 | Poncher et al. | July 18, 1950 |
| D. 161,455 | Jenkins | Jan. 2, 1951 |
| 2,281,215 | Van Auken | Apr. 28, 1942 |